(12) United States Patent
Chen et al.

(10) Patent No.: US 9,235,713 B2
(45) Date of Patent: Jan. 12, 2016

(54) METHOD, DEVICE, AND SYSTEM FOR ENCRYPTING AND DECRYPTING IMAGE

(71) Applicant: Tencent Technology (Shenzhen) Company Limited, Shenzhen (CN)

(72) Inventors: Jianming Chen, Shenzhen (CN); Xiaosheng Zheng, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 186 days.

(21) Appl. No.: 14/040,553

(22) Filed: Sep. 27, 2013

(65) Prior Publication Data

US 2014/0032929 A1   Jan. 30, 2014

Related U.S. Application Data

(63) Continuation of application No. PCT/CN2013/079676, filed on Jul. 19, 2013.

(30) Foreign Application Priority Data

Jul. 20, 2012  (CN) .......................... 2012 1 0252540

(51) Int. Cl.
  *G06F 21/60*    (2013.01)
  *G06F 21/62*    (2013.01)
  *G06F 21/78*    (2013.01)

(52) U.S. Cl.
  CPC .......... *G06F 21/602* (2013.01); *G06F 21/6209* (2013.01); *G06F 21/78* (2013.01); *G06F 2221/2107* (2013.01)

(58) Field of Classification Search
  CPC ... G06F 21/602; G06F 21/6209; G06F 21/62; H04N 1/44; H04L 9/0825
  See application file for complete search history.

(56) References Cited

U.S. PATENT DOCUMENTS 6,173,291 B1 *  1/2001  Jenevein
6,425,081 B1 *  7/2002  Iwamura ....................... 713/176

(Continued)

FOREIGN PATENT DOCUMENTS

AU    2002301583 A1    6/2003
CN    101847249 A      9/2010

(Continued)

OTHER PUBLICATIONS

Tencent Technology (Shenzhen) Company Limited, International Search Report and Written Opinion, PCT/CN2013/079676, Oct. 24, 2013, 12 pgs.

(Continued)

*Primary Examiner* — Michael Chao
*Assistant Examiner* — Shu Chun Gao
(74) *Attorney, Agent, or Firm* — Morgan, Lewis & Bockius LLP

(57) ABSTRACT

The present invention relates to the field of computers, and disclosed are a method, device, and system for encrypting and decrypting an image. The method for encrypting an image includes: encrypting a preset size of header data of a to-be-encrypted image, and obtaining an encrypted data corresponding to the header data; determining a storage location for saving the encrypted data, saving the encrypted data in the storage location, and acquiring an offset for saving the encrypted data; and placing the encryption identifier and the offset in a storage area of the preset size of the to-be-encrypted image, so as to encrypt the to-be-encrypted image. The system includes: a device for encrypting an image and a device for decrypting an image. The present invention is capable of improving the speed and efficiency of encrypting and decrypting an image.

15 Claims, 11 Drawing Sheets

(56) References Cited

U.S. PATENT DOCUMENTS

| | | | |
|---|---|---|---|
| 7,991,997 B2* | 8/2011 | Watson et al. | 713/160 |
| 8,578,128 B1* | 11/2013 | Davenport et al. | 711/202 |
| 2003/0188182 A1 | 10/2003 | Sato et al. | |
| 2009/0006724 A1* | 1/2009 | Chang et al. | 711/103 |

FOREIGN PATENT DOCUMENTS

| CN | 102033887 A | 4/2011 |
|---|---|---|
| CN | 102216921 A | 10/2011 |
| CN | 102819716 A | 12/2012 |
| WO | WO 2010/150056 A1 | 12/2010 |
| WO | WO 2011/151982 A1 | 12/2011 |
| WO | WO 2011151982 A1 * | 12/2011 |

OTHER PUBLICATIONS

Tencent Technology, IPRP, PCT/CN2013/079676, Jan. 20, 2015, 7 pgs.

* cited by examiner

METHOD, DEVICE, AND SYSTEM FOR ENCRYPTING AND DECRYPTING IMAGE

RELATED APPLICATIONS

This application is a continuation application of PCT Patent Application No. PCT/CN2013/079676, entitled "METHOD, DEVICE, AND SYSTEM FOR ENCRYPTING AND DECRYPTING IMAGE" filed on Jul. 19, 2013, which claims priority to Chinese Patent Application No. 201210252540.X, entitled "METHOD, DEVICE, AND SYSTEM FOR ENCRYPTING AND DECRYPTING IMAGE" filed on Jul. 20, 2012, both of which are incorporated by reference in their entirety.

TECHNICAL FIELD

The disclosed implementations relate generally to field of computers, and in particular, to a method, device, and system for encrypting and decrypting an image.

BACKGROUND

With the rapid development of the mobile terminal technologies, the mobile terminal is widely used by users. Accordingly, the information security of the mobile terminal obtains attention from the user. An image in the mobile terminal is one of the important materials of the user, and the user usually encrypts and decrypts an image to ensure the security of the image.

The prior art provides an encrypting and decrypting method, which specifically is: firstly, selecting, by a user, a to-be-encrypted image, and then, encrypting, by a mobile terminal through an encryption algorithm, the entire image selected by the user, so as obtain a encrypted data corresponding to the image; and when the image needs to be decrypted, decrypting, by the mobile terminal, the encrypted data corresponding to the image through an decryption algorithm, so as to obtain an reconstructed image, thereby decrypting the image During the implementation of the present invention, the inventor finds that the prior art has at least the following problem:

In the prior art, the entire image needs to be encrypted and decrypted, and therefore, the speed for encrypting and decrypting an image is low and the efficiency is low in the prior art.

SUMMARY

In order to improve the speed and efficiency of encrypting and decrypting an image, the present invention provides a method, device, and system for encrypting and decrypting an image. The technical solutions are as follows:

In accordance with some embodiments, a method for encrypting an image includes: encrypting a preset size of header data of a to-be-encrypted image and obtain an encrypted data corresponding to the header data; determining a storage location for saving the encrypted data, saving the encrypted data in the storage location, and acquiring an offset for saving the encrypted data; and placing the encryption identifier and the offset in a storage area of the preset size of the to-be-encrypted image, so as to encrypt the to-be-encrypted image.

The operations of determining a storage location for saving the encrypted data, saving the encrypted data in the storage location, and acquiring an offset for saving the encrypted data include:

determining the storage location for saving the encrypted data to be the end of the to-be-encrypted image, and saving the encrypted data at the end of the to-be-encrypted image; and acquiring an image size of the to-be-encrypted image, and determining the image size as the offset for saving the encrypted data.

The operations of placing the encryption identifier and the offset in a storage area of the preset size of the to-be-encrypted image include:

dividing the storage area of the preset size of the to-be-encrypted image into a first information area and a second information area; and placing the encryption identifier in the first information area, and placing the offset in the second information area.

The operations of determining a storage location for saving the encrypted data, saving the encrypted data in the storage location, and acquiring an offset for saving the encrypted data include:

dividing the storage area of the preset size of the to-be-encrypted image into a first information area, a second information area, and a third information area;

selecting a first encrypted data of a same size as that of the third information area from the encrypted data, determining a remaining unselected encrypted data as a second encrypted data, and determining a storage location for saving the first encrypted data to be the third information area and a storage location for saving the second encrypted data to be an end of the to-be-encrypted image;

using the first encrypted data to fill the third information area, and saving the second encrypted data at the end of the to-be-encrypted image; and acquiring an image size of the to-be-encrypted image, and determining the image size as an offset for saving the second encrypted data.

The operations of placing the encryption identifier and the offset in a storage area of the preset size of the to-be-encrypted image include:

placing the encryption identifier in the first information area, and placing the offset in the second information area.

Before the operations of encrypting a preset size of header data of a to-be-encrypted image, the following is further included:

judging whether the header data of the preset size of the to-be-encrypted image includes the encryption identifier, and if yes, judging that the to-be-encrypted image is an encrypted image.

A method for decrypting an image encrypted through the method for encrypting an image includes:

acquiring an offset from a storage area of a preset size of a to-be-decrypted image, and acquiring a encrypted data corresponding to header data of the to-be-decrypted image from the to-be-decrypted image based on the offset;

decrypting the encrypted data to obtain the header data being of the preset size and corresponding to the to-be-decrypted image; and placing the header data in the storage area of the preset size of the to-be-decrypted image, so as to decrypt the to-be-decrypted image.

The operations of acquiring an offset from a storage area of a preset size of a to-be-decrypted image, and acquiring a encrypted data corresponding to header data of the to-be-decrypted image from the to-be-decrypted image based on the offset, include:

determining an information area for saving the offset in the storage area of the preset size of the to-be-decrypted image, and acquiring the offset stored in the determined area; and determining an end of the to-be-decrypted image based on the offset, and acquiring data at the end of the to-be-decrypted image from the to-be-decrypted image, where the data at the end of the to-be-decrypted image is the encrypted data corresponding to the header data of the to-be-decrypted image.

The operations of acquiring an offset from a storage area of a preset size of a to-be-decrypted image, and acquiring a encrypted data corresponding to header data of the to-be-decrypted image from the to-be-decrypted image based on the offset, include:

determining an information area for saving the offset and an information area for saving the encrypted data in the storage area of the preset size of the to-be-decrypted image, and acquiring the offset stored in the information area for saving the offset and a first encrypted data stored in the information area for saving the encrypted data;

determining an end of the to-be-decrypted image based on the offset, and acquiring data at the end of the to-be-decrypted image from the to-be-decrypted image, where the data at the end of the to-be-decrypted image is a second encrypted data corresponding to the header data of the to-be-decrypted image; and combining the first encrypted data and the second encrypted data into the encrypted data corresponding to the header data of the to-be-decrypted image.

Before the operations of acquiring an offset from a storage area of a preset size of a to-be-decrypted image, the following is further included:

detecting an encryption identifier of the to-be-decrypted image; if yes, judging that the to-be-decrypted image is an encrypted image, and if not, judging that the to-be-decrypted image is an unencrypted image.

In accordance with some embodiments, a device for encrypting an image includes:

an encryption module, configured to encrypt a preset size of header data of a to-be-encrypted image, and obtain an encrypted data corresponding to the header data;

a storage module, configured to determine a storage location for saving the encrypted data, save the encrypted data in the storage location, and acquire an offset for saving the encrypted data; and a first filling module, configured to place an encryption identifier and the offset in a storage area of the preset size of the to-be-encrypted image, so as to encrypt the to-be-encrypted image.

The storage module includes:

a first storage unit, configured to determine the storage location for saving the encrypted data to be an end of the to-be-encrypted image, and save the encrypted data at the end of the to-be-encrypted image; and a first offsetting unit, configured to acquire an image size of the to-be-encrypted image, and determine the image size as the offset for saving the encrypted data.

The first filling module includes:

a first dividing unit, configured to divide the storage area of the preset size of the to-be-encrypted image into a first information area and a second information area; and a first filling unit, configured to place the encryption identifier in the first information area, and place the offset in the second information area.

The storage module includes:

a second dividing unit, configured to divide the storage area of the preset size of the to-be-encrypted image into a first information area, a second information area, and a third information area;

a second storage unit, configured to select a first encrypted data of a same size as that of the third information area from the encrypted data, determine a remaining unselected encrypted data as a second encrypted data, and determine a storage location for saving the first encrypted data to be the third information area and a storage location for saving the second encrypted data to be an end of the to-be-encrypted image;

a third storage unit, configured to save the first encrypted data in the third information area, and save the second encrypted data at the end of the to-be-encrypted image; and a second offsetting unit, configured to acquire an image size of the to-be-encrypted image, and determine the image size as an offset for saving the second encrypted data.

The first filling module is specifically configured to place the encryption identifier in the first information area, and place the offset in the second information area.

The device further includes:

a first judging module, configured to judge whether the header data of the preset size of the to-be-encrypted image includes the encryption identifier; if yes, judge that the to-be-encrypted image is an encrypted image, and if not, judge that the to-be-encrypted image is an unencrypted image.

A device for decrypting an image encrypted through the device for encrypting an image includes:

an acquisition module, configured to acquire an offset from a storage area of a preset size of a to-be-decrypted image, and acquire, based on the offset, a encrypted data corresponding to header data of the to-be-decrypted image from the to-be-decrypted image;

a decryption module, configured to decrypt the encrypted data to obtain the header data being of the preset size and corresponding to the to-be-decrypted image; and a second filling module, configured to place the header data at the storage area of the preset size of the to-be-decrypted image, so as to decrypt the to-be-decrypted image.

The acquisition module includes:

a first acquisition unit, configured to determine an information area for saving the offset in the storage area of the preset size of the to-be-decrypted image, and acquire the offset stored in the determined area; and a second acquisition unit, configured to determine an end of the to-be-decrypted image based on the offset, and acquire data at the end of the to-be-decrypted image from the to-be-decrypted image, where the data at the end of the to-be-decrypted image is the encrypted data corresponding to the header data of the to-be-decrypted image.

The acquisition module includes:

a third acquisition unit, configured to determine an information area for saving the offset and an information area for saving the encrypted data in the storage area of the preset size of the to-be-decrypted image, and acquire the offset stored in the information area for saving the offset and a first encrypted data stored in the information area for saving the encrypted data;

a fourth acquisition unit, configured to determine the end of the to-be-decrypted image based on the offset, and acquire data at the end of the to-be-decrypted image from the to-be-decrypted image, where the data at the end of the to-be-decrypted image is a second encrypted data corresponding to the header data of the to-be-decrypted image; and a forming unit, configured to form, by using the first encrypted data and the second encrypted data, the encrypted data corresponding to the header data of the to-be-decrypted image.

In accordance with some embodiments, the device further includes:

a second judging module, configured to detect an encryption identifier in the storage area of the preset size of the to-be-decrypted image; if yes, judge that the to-be-decrypted image is an encrypted image, and if not, judge that the to-be-decrypted image is an unencrypted image.

In accordance with some embodiments, a system for encrypting and decrypting an image includes the device for encrypting an image and the device for decrypting an image.

In accordance with some embodiments, a method of encrypting an image performed at a handheld computer having one or more processors and memory for storing one or more programs to be executed by the one or more processors, comprises: encrypting data of a preset size of a to-be-encrypted image; obtaining a encrypted data corresponding to the header data; determining a storage location for the cipher text; saving the encrypted data in the storage location; acquiring an offset for the storage location; and placing an encryption identifier and the offset in a storage area of the preset size of the to-be-encrypted image.

In accordance with some embodiments, a method for decrypting an image file performed at a handheld computer having one or more processors and memory for storing one or more programs to be executed by the one or more processors, comprises: acquiring an offset from a storage area of a preset size of a to-be-decrypted image, acquiring a encrypted data corresponding to header data of the to-be-decrypted image from the to-be-decrypted image based on the offset; decrypting the encrypted data to obtain the header data corresponding to the to-be-decrypted image file; and placing the header data in the storage area of the preset size of the to-be-decrypted image.

In accordance with some embodiments, a device for encrypting and decrypting an image, comprises: one or more processors; and memory for storing program modules, wherein the program modules comprise: an encryption module, configured to encrypt a preset size of header data of a to-be-encrypted image, and obtain an encrypted data corresponding to the header data; a storage module, configured to determine a storage location for saving the encrypted data, save the encrypted data in the storage location, and acquire an offset for saving the encrypted data; and a first filling module, configured to place an encryption identifier and the offset in a storage area of the preset size of the to-be-encrypted image.

In accordance with some embodiments, the program modules of the device further comprise: an acquisition module, configured to acquire an offset from a storage area of a preset size of a to-be-decrypted image, and acquire, based on the offset, a encrypted data corresponding to header data of the to-be-decrypted image from the to-be-decrypted image; a decryption module, configured to decrypt the encrypted data to obtain the header data being of the preset size and corresponding to the to-be-decrypted image; and a second filling module, configured to place the header data at the storage area of the preset size of the to-be-decrypted image.

In accordance with some embodiments, a method for encrypting an image performed at a handheld computer having a processor and memory for storing one or more programs to be executed by the processor, comprises: obtaining a size of header data of an image file; encrypting the header data; in the process of encrypting the header data, obtaining a encrypted data corresponding to the header data; dividing the encrypted data into a first part and a second part based on the size of the header data and the size of the encrypted data; replacing the header data with a first part of the cipher text, a location information and an encryption identifier; and placing the second part of the encrypted data to the end of the image file.

In accordance with some embodiments, a handheld computer, comprises: one or more processors; memory; and one or more programs stored in the memory and to be executed by the processor, the one or more programs including instructions for: encrypting data of preset size from beginning of an image file; in the process of encrypting the header data, obtaining a encrypted data corresponding to the header data; removing the data of preset size from the image file; adding an encryption identifier to the image file; and saving the encrypted data in a location that is separate from the image file.

In accordance with some embodiments, the memory includes RAM and non-volatile memory and the one or more programs further includes instructions for: decrypting the encrypted data to obtain the original data; moving the decrypted original data into RAM; acquiring the image file from non-volatile memory; placing the decrypted original data and the image file into a data stream; displaying the image from the data stream; and after displaying the image, removing the decrypted original data from the RAM.

In some embodiments of the present invention, the header data of the preset size of the to-be-encrypted image is encrypted, so as to obtain the encrypted data corresponding to the header data; the storage location for saving the encrypted data is determined, and the encrypted data is stored according to the storage location; and the offset for saving the encrypted data is acquired, and the encryption identifier and the offset are used to fill the storage area of the preset size of the to-be-encrypted image, so as to encrypt the to-be-encrypted image. The offset is acquired from the storage area of the preset size of the to-be-decrypted image, the encrypted data corresponding to the header data of the to-be-decrypted image is acquired from the to-be-decrypted image based on the offset; the encrypted data is decrypted to obtain the header data being of the preset size and corresponding to the to-be-decrypted image; and the header data is placed in the storage area of the preset size of the to-be-decrypted image, so as to decrypt the to-be-decrypted image. When the to-be-encrypted image is encrypted, only the header data of the preset size of the to-be-encrypted image is encrypted, so that the entire to-be-encrypted image does not need to be encrypted, thereby improving the speed and efficiency of encrypting an image. When the to-be-decrypted image is decrypted, the encrypted data corresponding to the header data of the preset size of the to-be-decrypted image is decrypted, so that the entire to-be-decrypted image does not need to be decrypted, thereby improving the speed and efficiency of decrypting an image.

BRIEF DESCRIPTION OF DRAWINGS

The aforementioned implementation of the invention as well as additional implementations will be more clearly understood as a result of the following detailed description of the various aspects of the invention when taken in conjunction of the drawings. Like reference numerals refer to corresponding parts throughout the several views of the drawings.

DETAILED DESCRIPTION

To make the objectives, technical solutions, and advantages of the present invention clearer, the embodiments of the present invention are described in further detail below of reference to the accompanying drawings.

Figure 1:
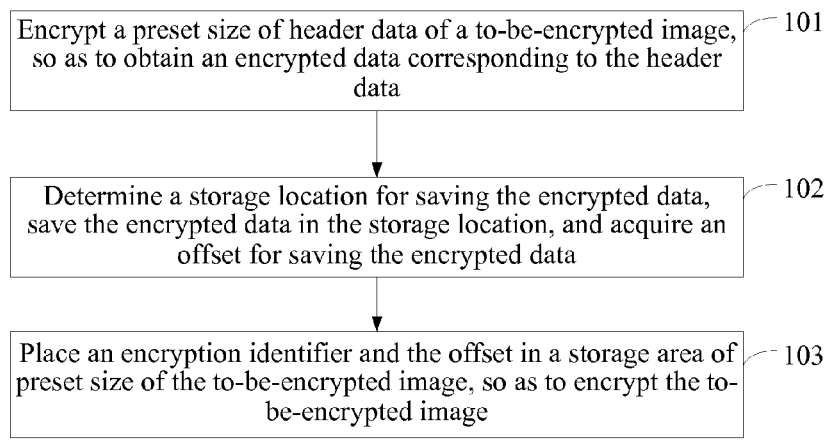
FIG. 1 is a flow chart of a method for encrypting an image in accordance with some embodiments.

As shown in FIG. 1, an embodiment of the present invention provides a method for encrypting an image, which includes the following steps:

Step 101: Encrypt a preset size of header data of a to-be-encrypted image, and obtain an encrypted data corresponding to the header data.

Step 102: Determine a storage location for saving the encrypted data, save the encrypted data in the storage location, and acquire an offset for saving the encrypted data.

Step 103: Place an encryption identifier and the offset in a storage area of the preset size of the to-be-encrypted image, so as to encrypt the to-be-encrypted image.

In the embodiment of the present invention, the header data of the preset size of the to-be-encrypted image is encrypted, so as to obtain the encrypted data corresponding to the header data; the storage location for saving the encrypted data is determined, and the encrypted data is stored according to the storage location; and the offset for saving the encrypted data is acquired, and the encryption identifier and the offset are used to fill the storage area of the preset size of the to-be-encrypted image, so as to encrypt the to-be-encrypted image. When the to-be-encrypted image is encrypted, only the header data of the preset size of the to-be-encrypted image is encrypted, so that the entire to-be-encrypted image does not need to be encrypted, thereby improving the speed and efficiency of encrypting an image.

Figure 2:
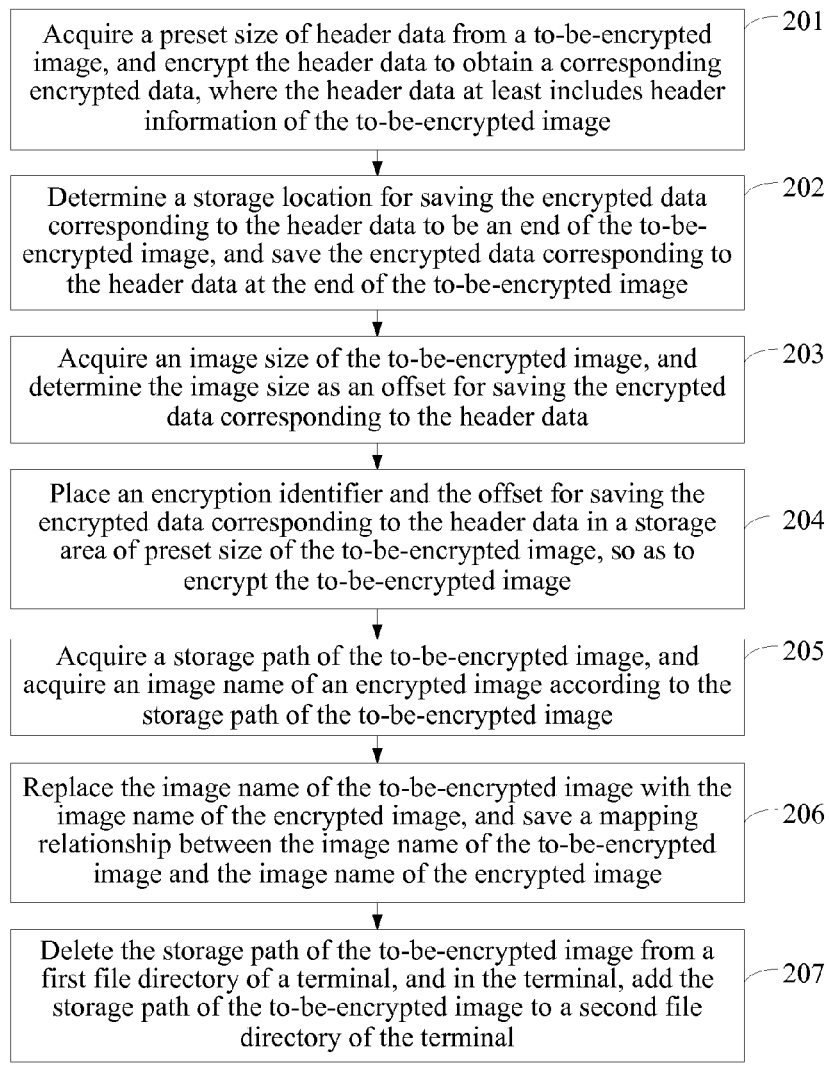
FIG. 2 is a flow chart of a method for encrypting an image in accordance with some embodiments.

An embodiment of the present invention provides a method for encrypting an image. A user may select an image needing to be encrypted to submit the image to a terminal, and the terminal takes the image as a to-be-encrypted image and encrypts the to-be-encrypted image through the encrypting method provided in this embodiment. Referring to FIG. 2, the method includes the following steps:

Step 201: Acquire header data of a preset size in the front from a to-be-encrypted image, and encrypt the header data to obtain a corresponding encrypted data, where the header data at least includes header information of the to-be-encrypted image.

Figure 3:
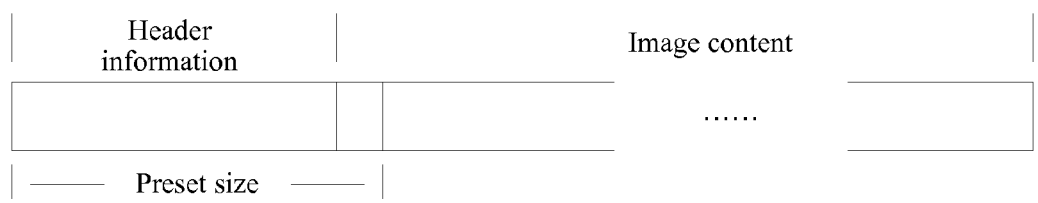
FIG. 3 is a schematic structural diagram of a first to-be-encrypted image illustrated in FIG. 2 in accordance with some embodiments.

Referring to FIG. 3, the to-be-encrypted image includes two parts, namely, the header information of the to-be-encrypted image and an image content, where the header information of the to-be-encrypted image includes information such as the width, height, and color code of the to-be-encrypted image, and an image decoder needs to display, according to the header information of the to-be-encrypted image, the to-be-encrypted image.

The length of the header information of the to-be-encrypted image is smaller than or equal to the preset size, and therefore, The header data acquired from the to-be-encrypted image at least includes the header information of the to-be-encrypted image, and may further include the image content of the to-be-encrypted image.

The header data may be encrypted according to an encryption password input by the user and through a preset encryption algorithm so as to obtain the corresponding encrypted data, where the size of the encrypted data is greater than or equal to the preset size. The encryption algorithm may be an advanced encryption standard (AES) encryption algorithm or an RSA encryption algorithm, and the like.

The preset size may be 1 KB, 2 KB or 3 KB, and the like, and the specific value of the preset size is not limited in this embodiment.

Step 202: Determine a storage location for saving the encrypted data corresponding to the header data to be an end of the to-be-encrypted image, and save the encrypted data corresponding to the header data at the end of the to-be-encrypted image.

Step 203: Acquire an image size of the to-be-encrypted image, and determine the image size as an offset for saving the encrypted data corresponding to the header data.

Step 204: Use an encryption identifier and the offset for saving the encrypted data corresponding to the header data to fill a storage area of the preset size of the to-be-encrypted image, so as to encrypt the to-be-encrypted image.

Specifically, the storage area of the preset size of the to-be-encrypted image is divided into a first information area and a second information area, the encryption identifier is placed in the first information area, and the offset for saving the encrypted data corresponding to the header data is placed in an offset area, so as to encrypt the to-be-encrypted image.

Figure 4:
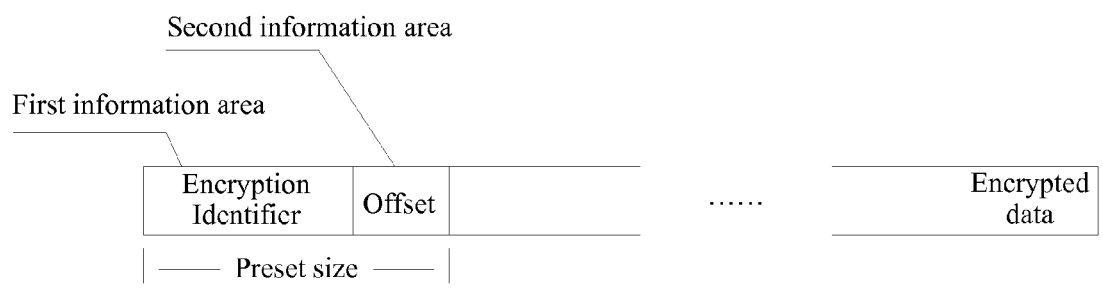
FIG. 4 is a schematic structural diagram of a second to-be-encrypted image illustrated in FIG. 2 in accordance with some embodiments.

For example, referring to the encrypted to-be-encrypted image shown in FIG. 4, the encrypted data corresponding to the header data is stored at the end of the to-be-encrypted image; the storage area of the preset size of the to-be-encrypted image is divided into the first information area and the second information area. The first information area is filled with the encryption identifier, and the offset area is filled with the offset for saving the encrypted data corresponding to the header data.

When displaying the to-be-encrypted image, the terminal needs to display, according to the header information of the to-be-encrypted image, the to-be-encrypted image, where the header information includes information such as the width, height, and color code of the to-be-encrypted image. In this embodiment, the header data of the preset size of the to-be-encrypted image at least includes the header information of the to-be-encrypted image, The header data is encrypted, and the encryption identifier and the offset are used to overwrite data stored in the storage area of the preset size of the to-be-encrypted image, which results in an interference to the data stored in the storage area of the preset size of the to-be-encrypted image, so that the image decoder is incapable of acquiring the header information of the to-be-encrypted image, and therefore incapable of displaying the to-be-encrypted image, thereby ensuring the security of the image.

The to-be-encrypted image is stored in a magnetic disk of the terminal. In this embodiment, only the following needs to be done: the header data of the preset size of the to-be-encrypted image is read from the magnetic disk of the terminal, and the read header data is encrypted. Compared to the prior art where the entire to-be-encrypted image needs to be read from the magnetic disk of the terminal, and then the entire to-be-encrypted image is encrypted, the speed and efficiency of the encrypting method provided in this embodiment are improved greatly.

Step 205: Optionally, acquire a storage path of the to-be-encrypted image, and acquire an image name of an encrypted image according to the storage path of the to-be-encrypted image.

Specifically, the storage path of the to-be-encrypted image is acquired from a first file directory of the terminal, a string is calculated according to the storage path of the to-be-encrypted image, and through an MD5 algorithm, and the calculated string is determined as the image name of the encrypted image.

A storage path of each unencrypted file included by the terminal is stored in the first file directory of the terminal.

Step 206: Optionally, replace the image name of the to-be-encrypted image with the image name of the encrypted image, and store correspondence between the image name of the to-be-encrypted image and the image name of the encrypted image.

Step 207: Optionally, delete the storage path of the to-be-encrypted image from the first file directory of the terminal, and in the terminal, add the storage path of the to-be-encrypted image to a second file directory of the terminal.

The second file directory of the terminal is used to store a storage path of an encrypted file included in the terminal. In this embodiment, the to-be-encrypted image is encrypted, and the to-be-encrypted image is not moved during the whole encrypting process. Therefore, the storage path of the to-be-encrypted image is the same as that of the encrypted image.

In this embodiment, the storage path of the unencrypted file is stored through the first file directory, and the storage path of the encrypted file is stored through the second file directory. In this way, the user may manage the file conveniently, thereby improving the efficiency of file management.

Further, a thumbnail image of the to-be-encrypted image may be acquired before Step 204 is performed, and correspondingly, in Step 207, correspondence between the image name of the encrypted image and the thumbnail image of the to-be-encrypted image may be stored.

Further, if Steps 205 and 206 are not performed, correspondence between the image name of the to-be-encrypted image and the thumbnail image of the to-be-encrypted image may be stored.

Correspondingly, when the user selects an encrypted image, a thumbnail image corresponding to the image selected by the user is acquired according to an image name of the image selected by the user and from the correspondence between the image name and the thumbnail image, so that the acquired thumbnail image is displayed. In this way, the user may browse and manage an encrypted image conveniently, thereby improving the user experience.

Further, before Step 201 is performed, whether an area of the preset size of the to-be-encrypted image includes the encryption identifier is judged. If the encryption identifier is included, it is determined that the to-be-encrypted image is encrypted, and the user is prompted, and if the encryption identifier is not included, it is determined that the to-be-encrypted image is not encrypted, and Step 201 continues to be performed.

In the embodiment of the present invention, the header data of the preset size of the to-be-encrypted image is encrypted, so as to obtain the encrypted data corresponding to the header data; the offset for saving the encrypted data is acquired; the encryption identifier and the offset are used to fill the storage area of the preset size of the to-be-encrypted image, and the encrypted data is stored at the end of the to-be-encrypted image, so as to encrypt the to-be-encrypted image. When the to-be-encrypted image is encrypted, only the header data of the preset size of the to-be-encrypted image is encrypted, so that the entire to-be-encrypted image does not need to be encrypted, thereby improving the speed and efficiency of encrypting an image.

Figure 5:
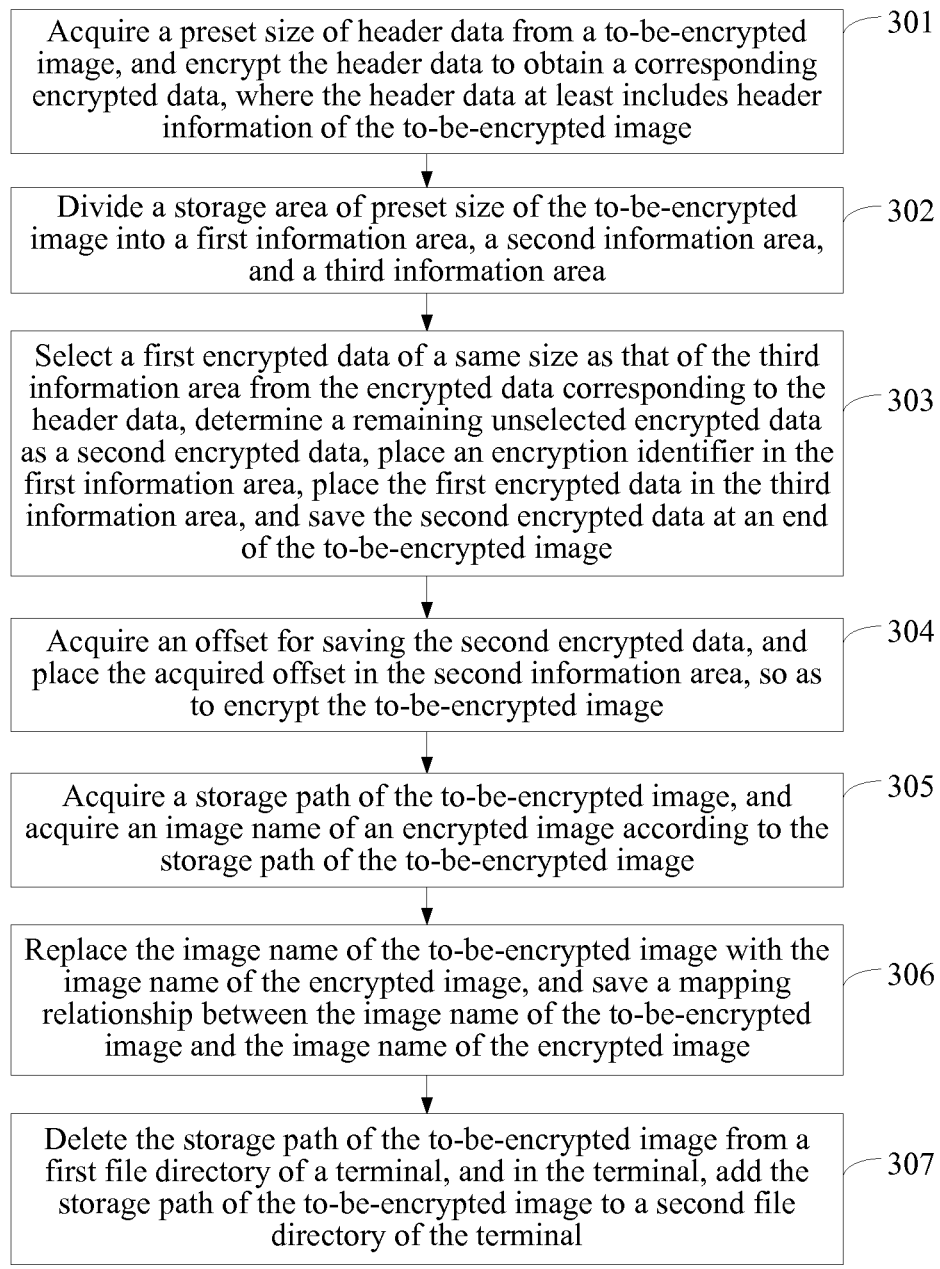
FIG. 5 is a flow chart of a method for encrypting an image in accordance with some embodiments.

An embodiment of the present invention provides a method for encrypting an image. A user may select an image needing to be encrypted to submit the image to a terminal, and the terminal takes the image as a to-be-encrypted image and encrypts the to-be-encrypted image through the encrypting method provided in this embodiment. Referring to FIG. 5, the method includes the following steps:

Step 301: Acquire header data of a preset size in the front from a to-be-encrypted image, and encrypt the header data to obtain a corresponding encrypted data, where the header data at least includes header information of the to-be-encrypted image.

Referring to FIG. 3, the to-be-encrypted image includes two parts, namely, the header information of the to-be-encrypted image and an image content, where the header information of the to-be-encrypted image includes information such as the width, height, and color code of the to-be-encrypted image, and an image decoder needs to display, according to the header information of the to-be-encrypted image, the to-be-encrypted image.

The length of the header information of the to-be-encrypted image is smaller than or equal to the preset size, and therefore, The header data acquired from the to-be-encrypted image at least includes the header information of the to-be-encrypted image, and may further include the image content of the to-be-encrypted image.

The header data may be encrypted according to an encryption password input by the user and through a preset encryption algorithm so as to obtain the corresponding encrypted data, where the size of the encrypted data is greater than or equal to the preset size. The encryption algorithm may be an AES encryption algorithm or an RSA encryption algorithm, and the like.

The preset size may be 1 KB, 2 KB or 3 KB, and the like, and the specific value of the preset size is not limited in this embodiment.

Step 302: Divide a storage area of the preset size of the to-be-encrypted image into a first information area, a second information area, and a third information area.

Figure 6:
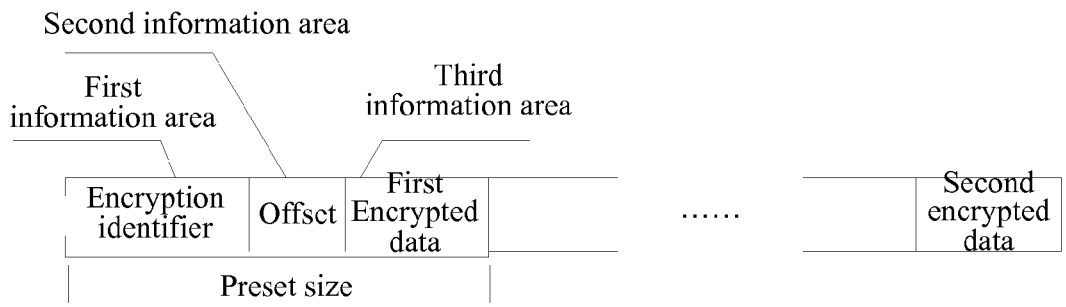
FIG. 6 is a schematic structural diagram of a to-be-encrypted image illustrated in FIG. 5 in accordance with some embodiments.

Referring to FIG. 6, the storage area of the preset size of the to-be-encrypted image is divided into the first information area, the second information area, and the third information area, where the first information area may be located in front of the second information area, and the second information area may be located in front of the third information area.

Step 303: Select a first encrypted data of a same size as that of the third information area from the encrypted data corresponding to the header data. Determine a remaining unselected encrypted data as a second encrypted data. Place an encryption identifier in the first information area, save the first encrypted data in the third information area. And save the second encrypted data at the end of the to-be-encrypted image.

A encrypted data is selected from the encrypted data corresponding to the header data. The selected encrypted data is determined as the first encrypted data, and a remaining unselected encrypted data is determined as the second encrypted data. The encryption identifier is placed in the first information area, the first encrypted data is placed in the third information area, and the second encrypted data is stored at the end of the to-be-encrypted image, and Alternatively, a encrypted data of the preset fifth size at the rear is selected from the encrypted data corresponding to the header data, the selected encrypted data of the preset fifth size is determined as the first encrypted data, and a remaining unselected encrypted data is determined as the second encrypted data; the encryption identifier is placed in the first information area, the first encrypted data is placed in the third information area, and the second encrypted data is stored at the end of the to-be-encrypted image.

Step 304: Acquire an offset for saving the second encrypted data, and use the acquired offset to fill the second information area, so as to encrypt the to-be-encrypted image.

Specifically, an image size of the to-be-encrypted image is acquired, the image size of the to-be-encrypted image is determined as the offset for saving the second encrypted data, and the offset is placed in the second information area.

For example, referring to FIG. 6, the encryption identifier is placed in the first information area, the offset is placed in the second information area, the first encrypted data selected from the encrypted data corresponding to the header data is placed in the third information area and the unselected second encrypted data is stored at the end of the to-be-encrypted image, so as to obtain the encrypted image shown in FIG. 6.

When displaying the to-be-encrypted image, the terminal needs to display, according to the header information of the to-be-encrypted image, the to-be-encrypted image. In this embodiment, the header data of the preset size of the to-be-encrypted image at least includes the header information of the to-be-encrypted image. The header data is encrypted, and the encryption identifier, the offset, and the first encrypted data corresponding to part of the header data are used to overwrite data stored in the storage area of the preset size of the to-be-encrypted image, which results in an interference to the header data of the to-be-encrypted image. Consequently, the image decoder is incapable of acquiring the header information of the to-be-encrypted image, and therefore incapable of displaying the to-be-encrypted image, thereby ensuring the security of the image.

The to-be-encrypted image is stored in a magnetic disk of the terminal. In this embodiment, only the following needs to be done: the header data of the preset size of the to-be-encrypted image is read from the magnetic disk of the terminal, and the header data is encrypted. Compared to the prior art where the entire to-be-encrypted image needs to be read from the magnetic disk of the terminal, and then the entire to-be-encrypted image needs to be encrypted, the speed and efficiency of the encrypting method provided in this embodiment are improved greatly.

Steps 305-307 are the same as Steps 205-207 respectively, and are not described in detail herein again.

Further, a thumbnail image of the to-be-encrypted image may be acquired before Step 302 is performed, and correspondingly, in Step 307, correspondence between the image name of the encrypted image and the thumbnail image of the to-be-encrypted image may be stored.

Further, if Steps 305 and 306 are not performed, correspondence between the image name of the to-be-encrypted image and the thumbnail image of the to-be-encrypted image may be stored.

Correspondingly, when the user selects an encrypted image, a thumbnail image corresponding to the image selected by the user is acquired according to an image name of the image selected by the user and from the correspondence between the image name and the thumbnail image, so that the acquired thumbnail image is displayed. In this way, the user may browse and manage an encrypted image conveniently, thereby improving the user experience.

Further, before Step 301 is performed, whether an area of the preset size of the to-be-encrypted image includes the encryption identifier is judged. If the encryption identifier is included, it is determined that the to-be-encrypted image is encrypted, and the user is prompted, and if the encryption identifier is not included, it is determined that the to-be-encrypted image is not encrypted, and Step 301 continues to be performed.

In the embodiment of the present invention, the header data of the preset size of the to-be-encrypted image is encrypted, so as to obtain the encrypted data corresponding to the header data; the first encrypted data is selected from the encrypted data, and the offset for saving the first encrypted data is acquired; and the encryption identifier, the offset, and the first encrypted data are used to fill the storage area of the preset size of the to-be-encrypted image, and the remaining unselected second encrypted data is stored at the end of the to-be-encrypted image, so as to encrypt the to-be-encrypted image. When the to-be-encrypted image is encrypted, only the header data of the preset size of the to-be-encrypted image is encrypted, so that the entire to-be-encrypted image does not need to be encrypted, thereby improving the speed and efficiency of encrypting an image.

Figure 7:
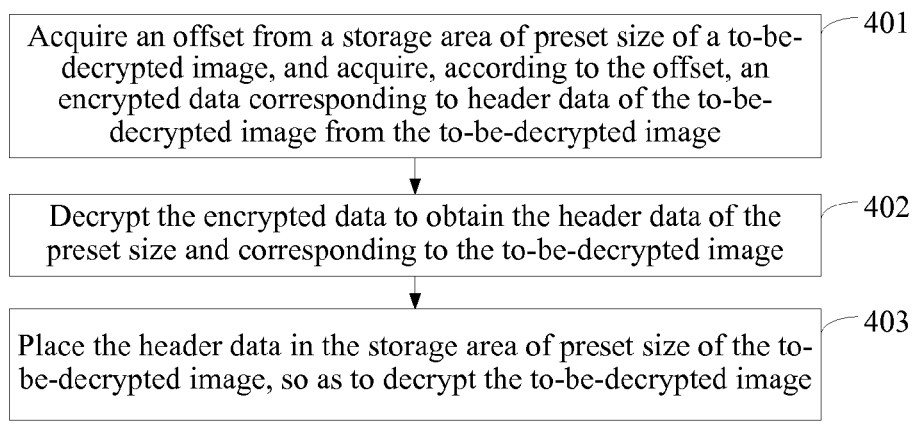
FIG. 7 is a flow chart of a method for decrypting an image in accordance with some embodiments.

As shown in FIG. 7, an embodiment of the present invention provides a method for decrypting an image encrypted through the method in Embodiment 1, which includes the following steps:

Step 401: Acquire an offset from a storage area of a preset size of a to-be-decrypted image, and acquire, based on the offset, a encrypted data corresponding to header data of the to-be-decrypted image from the to-be-decrypted image.

Step 402: Decrypt the encrypted data to obtain the header data being of the preset size and corresponding to the to-be-decrypted image.

Step 403: Place the header data at the storage area of the preset size of the to-be-decrypted image, so as to decrypt the to-be-decrypted image.

In the embodiment of the present invention, the offset is acquired from the storage area of the preset size of the to-be-decrypted image, the encrypted data corresponding to the header data of the to-be-decrypted image is acquired from the to-be-decrypted image based on the offset; the encrypted data is decrypted to obtain the header data being of the preset size and corresponding to the to-be-decrypted image; and the header data is placed in the storage area of the preset size of the to-be-decrypted image, so as to decrypt the to-be-decrypted image. When the to-be-decrypted image is decrypted, the encrypted data corresponding to the header data of the preset size of the to-be-decrypted image is decrypted, so that the entire to-be-decrypted image does not need to be decrypted, thereby improving the speed and efficiency of decrypting an image.

Figure 8:
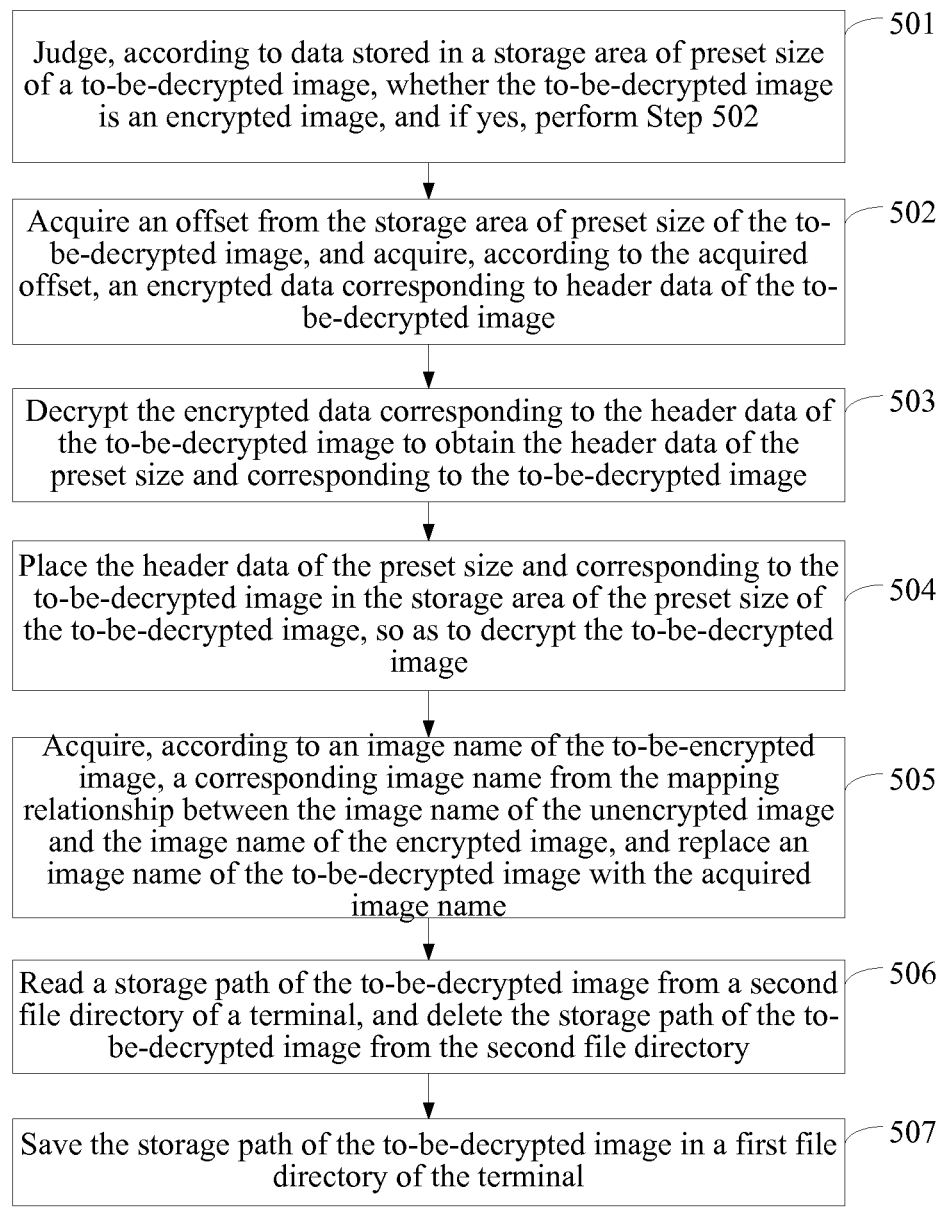
FIG. 8 is a flow chart of a method for decrypting an image in accordance with some embodiments.

An embodiment of the present invention provides a method for decrypting an image. A user selects an encrypted image, where the image is encrypted through the encrypting method in accordance with some embodiments. A terminal takes the image as a to-be-decrypted image, and decrypts the to-be-decrypted image through the decrypting method provided in this embodiment. Referring to FIG. 8, the method includes the following steps:

Step 501: judge, according to data stored in a storage area of a preset size of a to-be-decrypted image, whether the to-be-decrypted image is an encrypted image, and if yes, perform Step 502.

Specifically, an information area for storing header information is determined in the storage area of the preset size of the to-be-decrypted image, and data stored in the information area is acquired. If the acquired data is an encryption identifier, it is judged that the data to be decrypted is encrypted data, and if the acquired data is not the encryption identifier, it is judged that the data to be decrypted is unencrypted data.

If it is judged that the to-be-decrypted image is an unencrypted image, the operation is ended, and the user is prompted with a notice.

Step 502: acquire an offset from the area of the preset size of the to-be-decrypted image, and acquire, according to the acquired offset, a encrypted data corresponding to header data of the to-be-decrypted image.

Specifically, an information area for saving the offset is determined in the area of the preset size of the to-be-decrypted image, the offset stored in the information area is acquired, an end of the to-be-decrypted image is determined based on the offset, and data at the end of the to-be-decrypted image is acquired from the to-be-decrypted image, where the data at the end of the to-be-decrypted image is the encrypted data corresponding to the header data of the to-be-decrypted image Step 503: decrypt the encrypted data corresponding to the header data of the to-be-decrypted image to obtain the header data being of the preset size and corresponding to the to-be-decrypted image.

Specifically, the encrypted data corresponding to the header data of the to-be-decrypted image is decrypted through a decryption algorithm, so as to obtain the header data being of the preset size and corresponding to the to-be-decrypted image.

Step 504: use the header data being of the preset size and corresponding to the to-be-decrypted image to fill the storage area of the preset size of the to-be-decrypted image, so as to decrypt the to-be-decrypted image.

Step 505: acquire, according to an image name of the to-be-encrypted image, a corresponding image name from correspondence between an image name of an unencrypted image and an image name of an encrypted image, and replace an image name of the to-be-decrypted image with the acquired image name.

Step 506: read a storage path of the to-be-decrypted image from a second file directory of a terminal, and delete the storage path of the to-be-decrypted image from the second file directory.

Step 507: store the storage path of the to-be-decrypted image in a first file directory of the terminal.

In this embodiment, an encrypted image may be stored in a coffer, where the coffer includes a viewing interface and a deleting interface. The user may select an encrypted image from the viewing interface as a to-be-decrypted image, and then decrypt the to-be-decrypted image through the method provided in this embodiment and view the to-be-decrypted image. The user may delete an image from the deleting interface.

In the embodiment of the present invention, the offset is acquired from the storage area of the preset size of the to-be-decrypted image, the encrypted data corresponding to the header data of the to-be-decrypted image is acquired from the to-be-decrypted image based on the offset; the encrypted data is decrypted to obtain the header data being of the preset size and corresponding to the to-be-decrypted image; and the header data is placed in the storage area of the preset size of the to-be-decrypted image, so as to decrypt the to-be-decrypted image. When the to-be-decrypted image is decrypted, the encrypted data corresponding to the header data of the preset size of the to-be-decrypted image is decrypted, so that the entire to-be-decrypted image does not need to be decrypted, thereby improving the speed and efficiency of decrypting an image.

Figure 9:
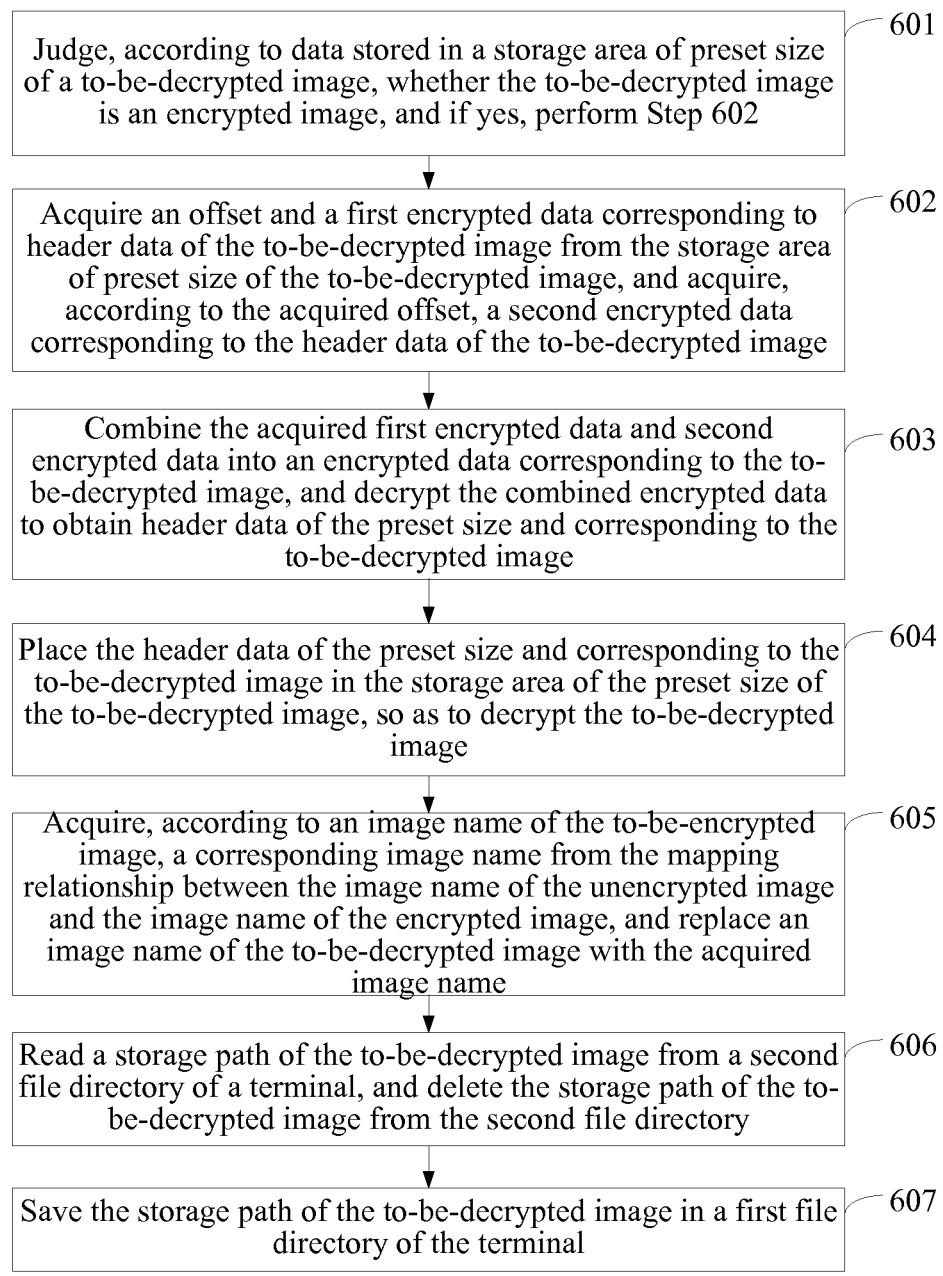
FIG. 9 is a flow chart of a method for decrypting an image in accordance with some embodiments.

An embodiment of the present invention provides a method for decrypting an image. A user selects an encrypted image, where the image is encrypted through the encrypting method in accordance with some embodiments; a terminal takes the image as a to-be-decrypted image, and decrypts the to-be-decrypted image through the decrypting method provided in this embodiment. Referring to FIG. 9, the method includes the following steps:

Step 601: Judge, according to data stored in a storage area of a preset size of a to-be-decrypted image, whether the to-be-decrypted image is an encrypted image, and if yes, perform Step 602.

Specifically, an information area for storing header information is determined in the storage area of the preset size of the to-be-decrypted image, and data stored in the information area is acquired. If the acquired data is an encryption identifier, it is judged that the data to be decrypted is encrypted data, and if the acquired data is not the encryption identifier, it is judged that the data to be decrypted is unencrypted data.

If it is judged that the to-be-decrypted image is an unencrypted image, the operation is ended, and the user is prompted.

Step 602: Acquire an offset and a first encrypted data corresponding to header data of the to-be-decrypted image from the area of the preset size of the to-be-decrypted image, and acquire, according to the acquired offset, a second encrypted data corresponding to the header data of the to-be-decrypted image.

Specifically, an information area for saving the offset and an information area for saving the encrypted data are determined in the area of the preset size of the to-be-decrypted image. The offset and the first encrypted data are acquired. An end of the to-be-decrypted image is determined based on the offset. Data at the end of the to-be-decrypted image is acquired from the to-be-decrypted image, wherein the data at the end of the to-be-decrypted image is the second encrypted data.

Step 603: Form, by using the acquired first encrypted data and second encrypted data, a encrypted data corresponding to the to-be-decrypted image, and decrypt the formed encrypted data to obtain header data being of the preset size and corresponding to the to-be-decrypted image.

Specifically, if the first encrypted data is a encrypted data of a preset third size in the front of the encrypted data corresponding to the header data, the first encrypted data is put in front of the second encrypted data and a encrypted data is formed, where the formed encrypted data is a encrypted data corresponding to the to-be-decrypted image, and the formed encrypted data is decrypted through a decryption algorithm, so as to obtain the header data being of the preset size and corresponding to the to-be-decrypted image.

If the first encrypted data is a encrypted data of a preset third size at the rear of the encrypted data corresponding to the header data, the first encrypted data is put behind the second encrypted data and a encrypted data is formed, where the formed encrypted data is a encrypted data corresponding to the to-be-decrypted image, and the formed encrypted data is decrypted through a decryption algorithm, so as to obtain the header data being of the preset size and corresponding to the to-be-decrypted image.

Step 604: Use the header data being of the preset size and corresponding to the to-be-decrypted image to fill the storage area of the preset size of the to-be-decrypted image, so as to decrypt the to-be-decrypted image.

Steps 605-607 are the same as Steps 505-507 respectively, which are not described in detail herein again.

In this embodiment, an encrypted image may be stored in a coffer, where the coffer includes a viewing interface and a deleting interface. The user may select an encrypted image from the viewing interface as a to-be-decrypted image, and then decrypt the to-be-decrypted image through the method provided in this embodiment and view the to-be-decrypted image. The user may delete an image from the deleting interface.

In the embodiment of the present invention, the offset and the first encrypted data are acquired from the storage area of the preset size of the to-be-decrypted image, the second encrypted data stored at the end of the to-be-decrypted image is acquired based on the offset, the encrypted data corresponding to the header data of the to-be-decrypted image is formed by using the first encrypted data and the second encrypted data, where the encrypted data is decrypted to obtain the header data being of the preset size and corresponding to the to-be-decrypted image, and the header data is placed in the storage area of the preset size of the to-be-decrypted image, so as to decrypt the to-be-decrypted image. When the to-be-decrypted image is decrypted, the encrypted data corresponding to the header data of the preset size of the to-be-decrypted image is decrypted, so that the entire to-be-decrypted image does not need to be decrypted, thereby improving the speed and efficiency of decrypting an image.

Figure 10:
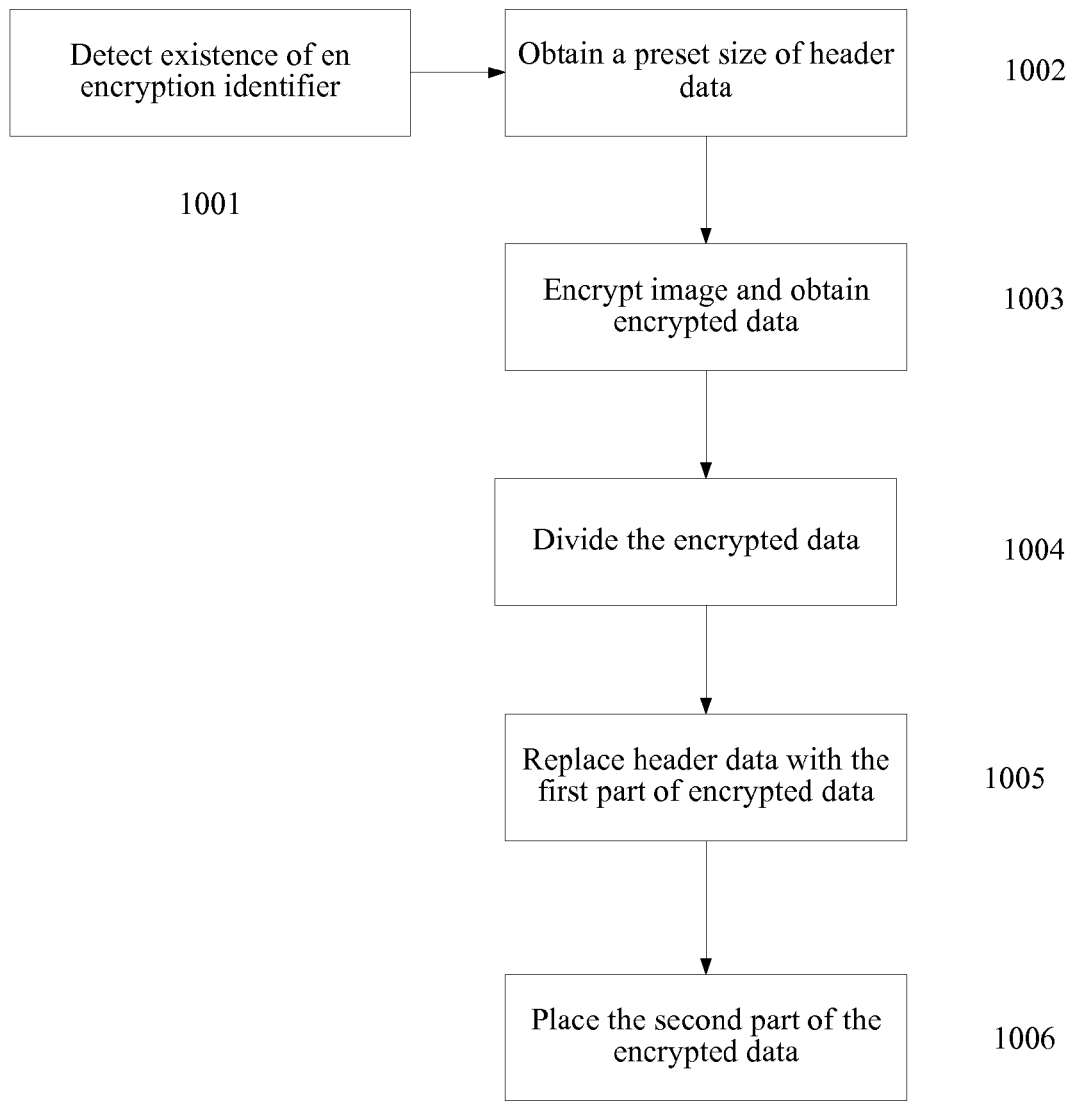
FIG. 10 is a flow chart of a method for encrypting an image in accordance with some embodiments.

FIG. 10 is a flow chart of a method for encrypting an image in accordance with some embodiments. The method is performed at image performed at a handheld computer having a processor and memory for storing one or more programs to be executed by the processor. In accordance with some embodiments, the handheld computer is In Step 1001, the handheld computer detects whether an encryption identifier is saved in the header information of an image. If there is an encryption identifier, the image has been encrypted and further encryption is prevented.

If no encryption identifier is detected, the computer then obtains the size of header data of the image file in Step 1002. In some embodiments, acquisition of header data is based on an analysis of the type of the image file. Header data in certain types of image files has fixed length. Header data in some other types of image files have distinguished feature from image data. The computer may also record some selected original information of the image-to-be-encrypted. The selected information includes i-node information and includes the name of the original image file, the original location of the original image file, the type of the image file and the location the encrypted image file.

In Step 1003, the header data of the image file is encrypted. In some embodiments, The encryption algorithm may be an AES encryption algorithm or an RSA encryption algorithm, and the like. In the process of encryption, a encrypted data is created and obtained.

In Step 1004, the encrypted data is divided into two parts. The size of the first part is determined by the size of the size of the header data and the size of the encrypted data. Normally, the size of the encrypted data is bigger than the size of the original header data. The size of the first part must be fit to be saved in the original storage area of the header data together with the encryption identifier and location information of the second part of the cipher text.

In Step 1005, replace the header data with the first part of the encrypted data, the location information of the second part of the cipher text and the encryption identifier. The location information can be an offset value that points to the end of the image file. The encryption identifier is to signal that the image file has been encrypted in order to prevent further encryption of the image file.

In Step 1006, place the second part of the encrypted data at the end of the image file.

During decryption, the computer acquires encrypted data from the beginning and the end of the image file based on the location information saved in the image file. After decrypting encrypted data, the computer places the acquired header data back to the beginning of the image file. The original image file is thus restored. The decryption process is described in, e.g., FIGS. 7-9, 12 and accompanying text, with more detail.

Figure 11:
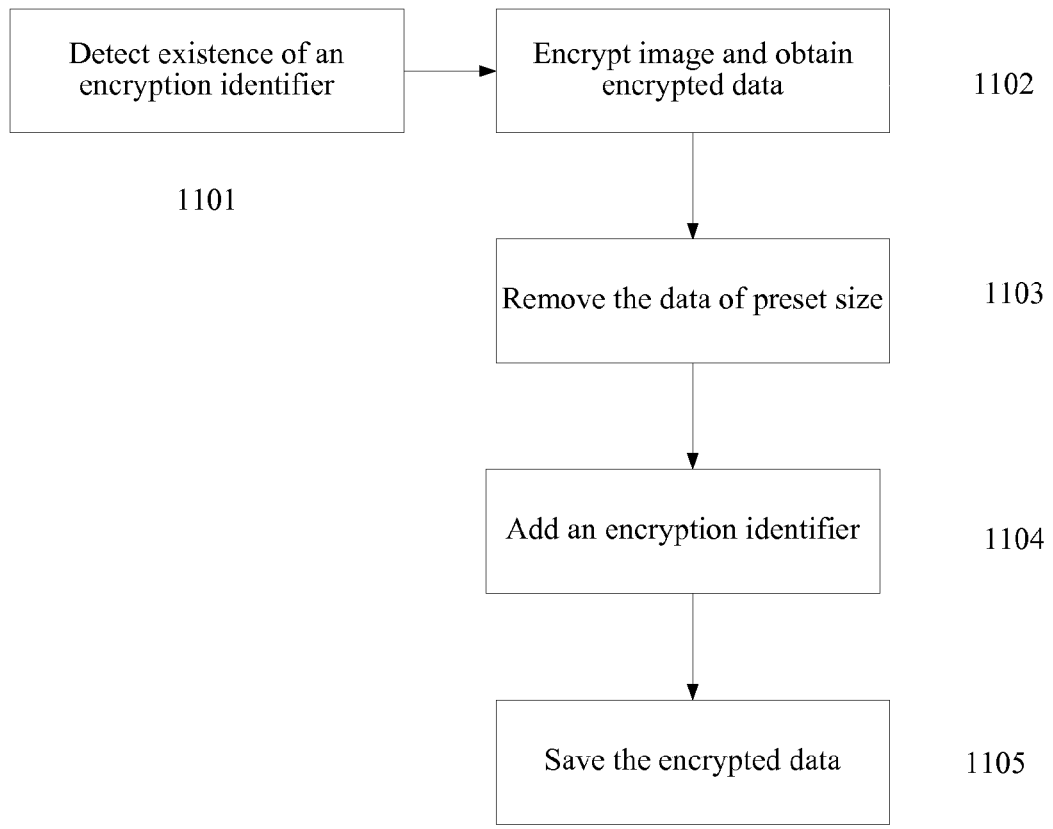
FIG. 11 is a flow chart of a method for encrypting an image in accordance with some embodiments.

FIG. 11 is a flow chart of a method for encrypting an image in accordance with some embodiments. The method is performed at image performed at a handheld computer having a processor and memory for storing one or more programs to be executed by the processor.

In Step 1101, the handheld computer judges whether an image file has been encrypted by detecting the encryption identifier. The method of judgment is the same with some other embodiments and will not be repeated here. The i-node information of original image file may be recorded in a database. The i-node information comprises the name of the original image file, the original location of the original image file, the type of the image file and the location the encrypted image file.

In Step 1102, the computer encrypts a preset size or length of data from the beginning of the image file. From the encryption, a cipher text is obtained. The preset size or length could be 1 kb, 2 kb, 5 kb, etc. Considerations of setting the size or length of the data to be encrypted include security and efficiency. A smaller size of data could be more efficient for encryption and decryption operation. However, it also produces higher security risk as only a smaller amount of data is encrypted since one could more easily recover an image file without having to decrypting the smaller amount of data.

In Step 1103, the data of preset size is removed from the image file after being encrypted.

In Step 1104, an encryption identifier is added to the image file in order to prevent further encryption.

In Step 1105, the encrypted data is saved in a location that is separate from the image file.

For this method, it is important to establish corresponding relationship between the image file whose certain data has been removed and the encryption data including the encrypted data. The recording of the i-node information is useful in restoring the original image file in description operation. In the description operation, the computer acquires the image file, the corresponding encrypted data and the i-node information.

Figure 12:
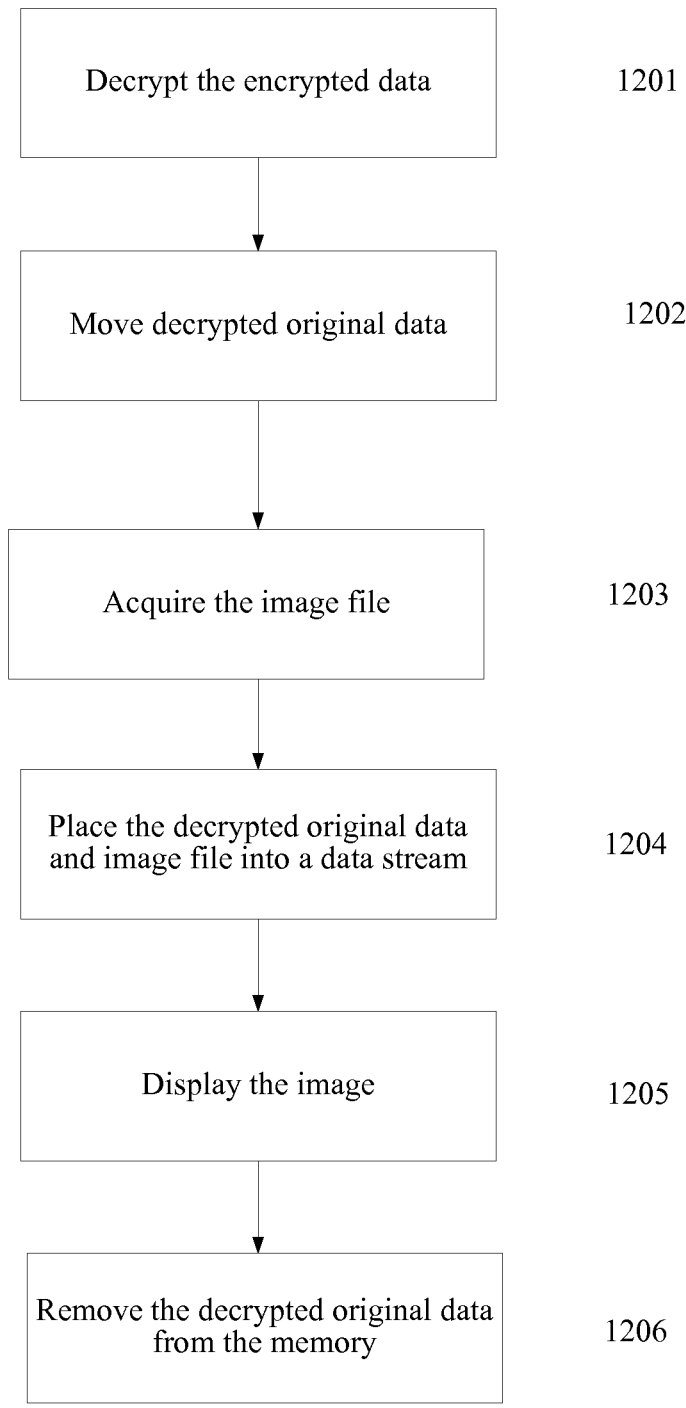
FIG. 12 is a flow chart of a method for encrypting an image in accordance with some embodiments.

FIG. 12 is a flow chart of a method for decrypting an image in accordance with some embodiments. The method is performed at a handheld computer having a processor and memory for storing one or more programs to be executed by the processor. The memory includes RAM (random access memory) and non-volatile memory. One example of non-volatile memory is a SD (Secure Digital) card in a cell phone.

In Step 1201, the computer decrypts the encrypted data to obtain the original data.

In Step 1202, the computer moves the decrypted original data into its RAM.

In Step 1203, the computer acquires the image file from a disk drive.

In Step 1204, the computer places the decrypted original data and the image file into a data stream.

In Step 1205, the computer displays the image from the data stream.

In Step 1206, after a user viewing the image, the computer removes the original data from the memory.

In this method, the whole operation can be transparent to the user. It could be achieved that many images are saved in a security file or safe box and that in order to view the many images the user only needs to enter the password (or provide identification in other means) once to enter the security file or safe box. In some embodiments, the encryption key is the same for the many images and could be the password of the user (or derivative from the password). The computer holds the password temporarily in the memory and releases it after the viewing operation is terminated. In other embodiments, the keys of many images can be different and saved in a location that is accessible only through entering the password. the decryption information including the key of for encryption/decryption can be saved in a location that is different from the locations of the image file and the encrypted data.

Figure 13:
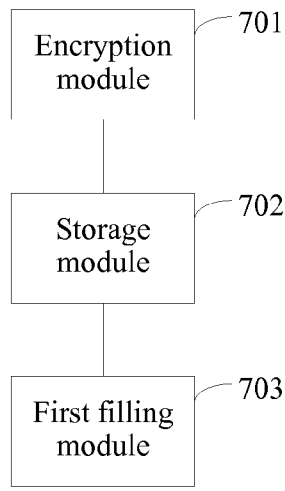
FIG. 13 is a schematic structural diagram of a device for encrypting an image in accordance with some embodiments.
Figure 14:
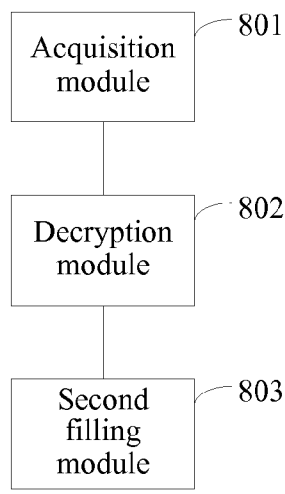
FIG. 14 is a schematic structural diagram of a device for decrypting an image in accordance with some embodiments.

FIG. 13 is a schematic structural diagram of a device for encrypting an image in accordance with some embodiments. In accordance with some embodiments, the modules described in FIGS. 13-14 are program modules configured to be executed by the one or more processors. In accordance with some embodiments, the modules described in FIGS. 13-14 are hardware figures and have physical structures.

As shown in FIG. 13, an embodiment of the present invention provides a device for encrypting an image, which includes:

an encryption module 701, configured to encrypt a preset size of header data of a to-be-encrypted image, and to obtain an encrypted data corresponding to the header data;

a storage module 702, configured to determine a storage location for saving the encrypted data, save the encrypted data in the storage location, and to acquire an offset for saving the encrypted data; and a first filling module 703, configured to place an encryption identifier and the offset in a storage area of the preset size of the to-be-encrypted image, so as to encrypt the to-be-encrypted image.

The storage module 702 includes:

a first storage unit, configured to determine the storage location for saving the encrypted data to be an end of the to-be-encrypted image, and to save the encrypted data at the end of the to-be-encrypted image; and a first offsetting unit, configured to acquire an image size of the to-be-encrypted image, and to determine the image size as the offset for saving the encrypted data.

The first filling module 703 includes:

a first dividing unit, configured to divide the storage area of the preset size of the to-be-encrypted image into a first information area and a second information area; and a first filling unit, configured to place the encryption identifier in the first information area, and to place the offset in the second information area.

The storage module 702 includes:

a second dividing unit, configured to divide the storage area of the preset size of the to-be-encrypted image into a first information area, a second information area, and a third information area;

a second storage unit, configured to select a first encrypted data of a same size as that of the third information area from the encrypted data, to determine a remaining unselected encrypted data as a second encrypted data, and to determine a storage location for saving the first encrypted data to be the third information area and a storage location for saving the second encrypted data to be the end of the to-be-encrypted image;

a third storage unit, configured to save the first encrypted data in the third information area, and to save the second encrypted data at the end of the to-be-encrypted image; and a second offsetting unit, configured to acquire the image size of the to-be-encrypted image, and to determine the image size as an offset for saving the second encrypted data.

The first filling unit 703 is specifically configured to place the encryption identifier in the first information area, and to place the offset in the second information area.

The device further includes:

a first judging module, configured to judge whether the header data of the preset size of the to-be-encrypted image includes the encryption identifier, and if yes, judge that the to-be-encrypted image is an encrypted image.

In the embodiment of the present invention, the header data of the preset size of the to-be-encrypted image is encrypted, so as to obtain the encrypted data corresponding to the header data; the storage location for saving the encrypted data is determined, and the encrypted data is stored according to the storage location; and the offset for saving the encrypted data is acquired, and the encryption identifier and the offset are used to fill the storage area of the preset size of the to-be-encrypted image, so as to encrypt the to-be-encrypted image. When the to-be-encrypted image is encrypted, only the header data of the preset size of the to-be-encrypted image is encrypted, so that the entire to-be-encrypted image does not need to be encrypted, thereby improving the speed and efficiency of encrypting an image.

As shown in FIG. 14, an embodiment of the present invention provides a device for decrypting an image encrypted through a device in accordance with some embodiments, which includes:

an acquisition module 801, configured to acquire an offset from a storage area of a preset size of a to-be-decrypted image, and acquire, based on the offset, a encrypted data corresponding to header data of the to-be-decrypted image from the to-be-decrypted image;

a decryption module 802, configured to decrypt the encrypted data to obtain header data being of the preset size and corresponding to the to-be-decrypted image; and a second filling module 803, configured to place the header data at the storage area of the preset size of the to-be-decrypted image, so as to decrypt the to-be-decrypted image.

The acquisition module 801 includes:

a first acquisition unit, configured to determine an information area for saving the offset in the storage area of the preset size of the to-be-decrypted image, and acquire the offset stored in the determined area; and a second acquisition unit, configured to determine an end of the to-be-decrypted image based on the offset, and acquire data at the end of the to-be-decrypted image from the to-be-decrypted image, where the data at the end of the to-be-decrypted image is the encrypted data corresponding to the header data of the to-be-decrypted image.

The acquisition module 801 includes:

a third acquisition unit, configured to determine an information area for saving the offset and an information area for saving the encrypted data in the storage area of the preset size of the to-be-decrypted image, and acquire the offset stored in the information area for saving the offset and a first encrypted data stored in the information area for saving the encrypted data;

a fourth acquisition unit, configured to determine the end of the to-be-decrypted image based on the offset, and acquire data at the end of the to-be-decrypted image from the to-be-decrypted image, where the data at the end of the to-be-decrypted image is a second encrypted data corresponding to the header data of the to-be-decrypted image; and a forming unit, configured to form, by using the first encrypted data and the second encrypted data, the encrypted data corresponding to the header data of the to-be-decrypted image.

The device further includes:

a second judging module, configured to detect an encryption identifier in the storage area of the preset size of the to-be-decrypted image; if yes, judge that the to-be-decrypted image is an encrypted image, and if not, judge that the to-be-decrypted image is an unencrypted image In the embodiment of the present invention, the offset is acquired from the storage area of the preset size of the to-be-decrypted image, the encrypted data corresponding to the header data of the to-be-decrypted image is acquired from the to-be-decrypted image based on the offset; the encrypted data is decrypted to obtain the header data being of the preset size and corresponding to the to-be-decrypted image; and the header data is placed in the storage area of the preset size of the to-be-decrypted image, so as to decrypt the to-be-decrypted image. When the to-be-decrypted image is decrypted, the encrypted data corresponding to the header data of the preset size of the to-be-decrypted image is decrypted, so that the entire to-be-decrypted image does not need to be decrypted, thereby improving the speed and efficiency of decrypting an image.

Figure 15:
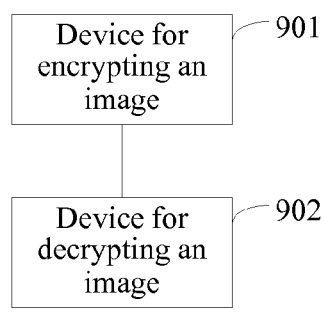
FIG. 15 is a schematic structural diagram of a system for encrypting and decrypting an image in accordance with some embodiments.

As shown in FIG. 15, an embodiment of the present invention provides a system for encrypting and decrypting an image, where the system includes the device for encrypting an image in accordance with some embodiments and the device for decrypting an image in accordance with some embodiments.

In the embodiments of the present invention, the header data of the preset size of the to-be-encrypted image is encrypted, so as to obtain the encrypted data corresponding to the header data; the storage location for saving the encrypted data is determined, and the encrypted data is stored according to the storage location; and the offset for saving the encrypted data is acquired, and the encryption identifier and the offset are used to fill the storage area of the preset size of the to-be-encrypted image, so as to encrypt the to-be-encrypted image. The offset is acquired from the storage area of the preset size of the to-be-decrypted image, the encrypted data corresponding to the header data of the to-be-decrypted image is acquired from the to-be-decrypted image based on the offset; the encrypted data is decrypted to obtain the header data being of the preset size and corresponding to the to-be-decrypted image; and the header data is placed in the storage area of the preset size of the to-be-decrypted image, so as to decrypt the to-be-decrypted image. When the to-be-encrypted image is encrypted, only the header data of the preset size of the to-be-encrypted image is encrypted, so that the entire to-be-encrypted image does not need to be encrypted, thereby improving the speed and efficiency of encrypting an image. When the to-be-decrypted image is decrypted, the encrypted data corresponding to the header data of the preset size of the to-be-decrypted image is decrypted, so that the entire to-be-decrypted image does not need to be decrypted, thereby improving the speed and efficiency of decrypting an image.

Figure 16:
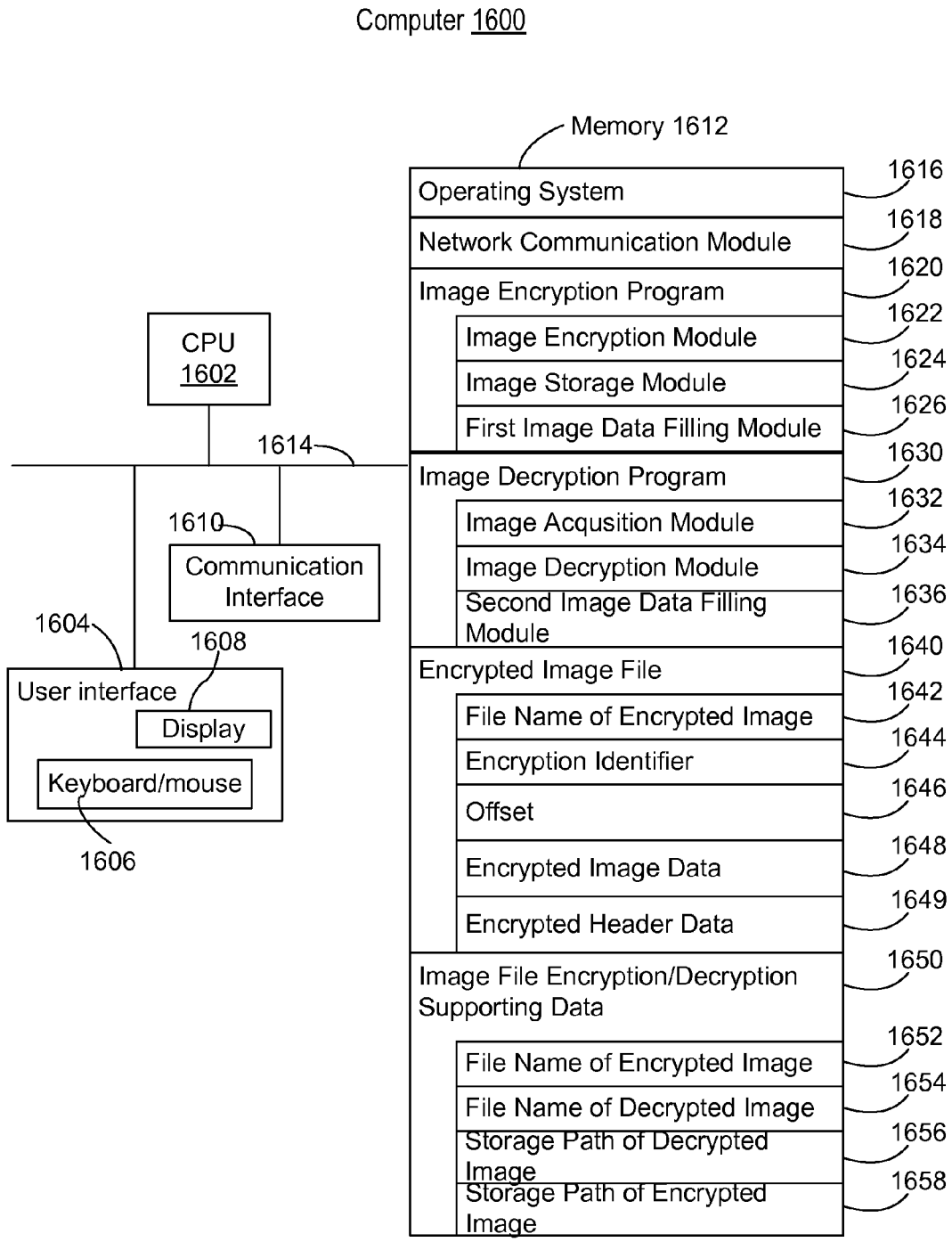
FIG. 16 is a block diagram illustrating the components of a computer for encrypting and decrypting images in accordance with some embodiments.

FIG. 16 is a block diagram illustrating the components of a computer 1600 for encrypting and decrypting images in accordance with some embodiments. The computer 1600 includes one or more processing units (CPU's) 1602 for executing modules, programs and/or instructions stored in memory 1612 and thereby performing processing operations; one or more network or other communications interfaces 1610; memory 1612; and one or more communication buses 1614 for interconnecting these components. In some implementations, the computer 1600 includes a user interface 304 comprising a display device 1608 and one or more input devices 1606 (e.g., keyboard or mouse).

In some implementations, the memory 1612 includes high-speed random access memory, such as DRAM, SRAM, DDR RAM or other random access solid state memory devices. In some implementations, memory 1612 includes non-volatile memory, such as one or more magnetic disk storage devices, optical disk storage devices, flash memory devices, or other non-volatile solid state storage devices. In some implementations, memory 1612 includes one or more storage devices remotely located from the CPU(s) 1602. Memory 1612, or alternately the non-volatile memory device(s) within memory 1612, comprises a non-transitory computer readable storage medium. In some implementations, memory 1612 or the computer readable storage medium of memory 1612 stores the following elements, or a subset of these elements, and may also include additional elements:

an operating system 1616 that includes procedures for handling various basic system services and for performing hardware dependent tasks;

a network communications module 1618 that is used for connecting the computer 1600 to other computers via the communication network interfaces 1610 and one or more communication networks (wired or wireless), such as the Internet, other wide area networks, local area networks, metropolitan area networks, and so on;

an image encryption program 1620 for encrypting an image file according to the embodiments of present application, the image encryption program 1620 further including an image encryption module 1622, an image storage module 1624, and a first image data filling module 1626 as described above in connection with FIGS. 1-6, 10-11, and 13;

an image decryption program 1630 for decrypting an encrypted image file according to the embodiments of present application, the image decryption program 1630 further including an image acquisition module 1632, an image decryption module 1634, and a second image data filling module 1636 as described above in connection with FIGS. 7-9, 12, and 14;

one or more encrypted image files 1640, each image file including a file name 1642, an encryption identifier 1644, an offset 1646, encrypted image 1648 and encrypted header data 1649 (optional); and image file encryption/decryption supporting data 1650, further including a file name of an encrypted image 1652, a file name of a decrypted image 1654 mapping to the file name of the encrypted image 1652, a storage path of the decrypted image 1656, and a corresponding storage path of the encrypted image 1658.

Persons of ordinary skill in the art may understand that all or part of the steps of the method according to the embodiments may be implemented by hardware or by a program instructing relevant hardware. The program may be stored in a computer readable storage medium, and the storage medium may be a read-only memory, a magnetic disk, or an optical disk, and so on.

The above descriptions are merely preferred embodiments of the present invention, but are not intended to limit the present invention. Any modification, equivalent replacement, or improvement made without departing from the spirit and principle of the present invention should fall within the protection scope of the present invention.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance of a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance of a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described of reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations of various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method for encrypting an image performed at a handheld computer having a processor and memory for storing one or more programs to be executed by the processor, comprising:
    obtaining a size of header data of an image file;
    encrypting the header data;
    in the process of encrypting the header data, obtaining encrypted data corresponding to the header data;
    dividing the encrypted data into a first part and a second part based on a size of the header data and a size of the encrypted data; and
    obtaining an encrypted image file for the image file based on the encrypted data, comprising:
        replacing the header data in the image file with the first part of the encrypted data, a location information and an encryption identifier; and
        placing the second part of the encrypted data to the end of the image file.

2. The method of claim 1, wherein the location information refers to the beginning of the second part of the encrypted data.

3. The method of claim 1, further comprising, before encrypting the header data, recording selected information of an original version of the image file in a database.

4. The method of claim 3, wherein the selected information of the original version of the image file includes a name of the original version of the image file, an original location of the original version of the image file, a type of the image file and a location for storing an encrypted version of the image file.

5. The method of claim 1, wherein the encryption identifier is configured to prevent further encryption of the encrypted image file.

6. A device, comprising:
    one or more processors; and
    memory for storing one or more programs to be executed by the processor, the programs comprising instructions for:
        obtaining a size of header data of an image file;
        encrypting the header data;
        in the process of encrypting the header data, obtaining encrypted data corresponding to the header data;

dividing the encrypted data into a first part and a second part based on a size of the header data and a size of the encrypted data;
obtaining an encrypted image file for the image file based on the encrypted data, comprising:
replacing the header data in the image file with the first part of the encrypted data, a location information and an encryption identifier; and
placing the second part of the encrypted data to the end of the image file.

7. The device of claim 6, wherein the location information refers to the beginning of the second part of the encrypted data.

8. The device of claim 6, further comprising, before encrypting the header data, recording selected information of an original version of the image file in a database.

9. The device of claim 8, wherein the selected information of the original version of the image file includes a name of the original version of the image file, an original location of the original version of the image file, a type of the image file and a location for storing an encrypted version of the image file.

10. The device of claim 6, wherein the encryption identifier is configured to prevent further encryption of the encrypted image file.

11. A non-transitory computer-readable storage medium having instructions stored thereon, the instructions, when executed by one or more processors, cause the processors to perform operations comprising:
obtaining a size of header data of an image file;
encrypting the header data;
in the process of encrypting the header data, obtaining encrypted data corresponding to the header data;
dividing the encrypted data into a first part and a second part based on a size of the header data and a size of the encrypted data; and
obtaining an encrypted image file for the image file based on the encrypted data, comprising:
replacing the header data in the image file with the first part of the encrypted data, a location information and an encryption identifier; and
placing the second part of the encrypted data to the end of the image file.

12. The computer-readable storage medium of claim 11, wherein the location information refers to the beginning of the second part of the encrypted data.

13. The computer-readable storage medium of claim 11, further comprising, before encrypting the header data, recording selected information of an original version of the image file in a database.

14. The computer-readable storage medium of claim 13, wherein the selected information of the original version of the image file includes a name of the original version of the image file, an original location of the original version of the image file, a type of the image file and a location for storing an encrypted version of the image file.

15. The computer-readable storage medium of claim 11, wherein the encryption identifier is configured to prevent further encryption of the encrypted image file.

* * * * *